United States Patent
Burba et al.

(10) Patent No.: US 10,142,411 B2
(45) Date of Patent: Nov. 27, 2018

(54) DYNAMIC SWARM SEGMENTATION

(71) Applicant: Microsoft Technology Licensing, LLC, Redmond, WA (US)

(72) Inventors: Alexander Burba, Seattle, WA (US); Brandon T. Hunt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 14/726,054

(22) Filed: May 29, 2015

(65) Prior Publication Data
US 2016/0352825 A1 Dec. 1, 2016

(51) Int. Cl.
*G06F 15/16* (2006.01)
*H04L 29/08* (2006.01)
*G06F 17/30* (2006.01)

(52) U.S. Cl.
CPC .... *H04L 67/1078* (2013.01); *G06F 17/30206* (2013.01); *H04L 67/1072* (2013.01)

(58) Field of Classification Search
CPC .................................................. H04L 67/1078
USPC ...................................................... 709/205
See application file for complete search history.

(56) References Cited

U.S. PATENT DOCUMENTS

| | | | |
|---|---|---|---|
| 7,716,660 B2 | 5/2010 | Mackay | |
| 7,970,835 B2 | 6/2011 | St. Jacques | |
| 8,019,882 B2 | 9/2011 | Rao et al. | |
| 8,103,870 B2 | 1/2012 | Clower et al. | |
| 8,316,364 B2 | 11/2012 | Stein | |
| 8,655,985 B2 | 2/2014 | De et al. | |
| 8,688,766 B2 | 4/2014 | Varvello et al. | |
| 8,688,803 B2 | 4/2014 | Manion et al. | |
| 8,819,092 B2 | 8/2014 | Ludwig et al. | |
| 8,832,290 B2 | 9/2014 | Li et al. | |
| 8,943,215 B2 | 1/2015 | Patten et al. | |
| 9,063,818 B1* | 6/2015 | Risbood | G06N 99/005 |
| 2002/0049760 A1 | 4/2002 | Scott et al. | |
| 2004/0236869 A1 | 11/2004 | Moon | |
| 2005/0216559 A1* | 9/2005 | Manion | H04L 67/104 709/205 |

(Continued)

FOREIGN PATENT DOCUMENTS

| | | |
|---|---|---|
| EP | 1672490 A2 | 6/2006 |
| WO | WO 2009003501 A1 | 1/2009 |
| WO | 2012142844 A1 | 10/2012 |
| WO | 2014194279 A1 | 12/2014 |

OTHER PUBLICATIONS

Hyungon, et al., "A Framework for Foresighted Resource Reciprocation in P2P Networks", IEEE Transactions on Multimedia, Jan. 2009, pp. 101-116.
International Search Report and Written Opinion issued in PCT Application No. PCT/US2016/031080, dated Jul. 28, 2016, 16 pages.

(Continued)

*Primary Examiner* — Normin Abedin
(74) *Attorney, Agent, or Firm* — Workman Nydegger

(57) ABSTRACT

Identifying peers to a client for the client to obtain data. A method includes receiving from the client an identification of a dataset and a specification of one or more byte ranges of the dataset. As a result, the method further includes identifying one or more other clients associated with the one or more byte ranges of the dataset to acts as peers to the client. The method further includes providing an indication of the one or more of the other identified clients as peers to the client.

20 Claims, 7 Drawing Sheets

(56) References Cited

U.S. PATENT DOCUMENTS

| | | | |
|---|---|---|---|
| 2005/0231514 A1* | 10/2005 | Harper | G06T 1/20 345/501 |
| 2006/0069800 A1* | 3/2006 | Li | G06F 17/30206 709/232 |
| 2006/0130037 A1* | 6/2006 | Mackay | G06F 8/68 717/168 |
| 2007/0294422 A1* | 12/2007 | Zuckerman | G06F 17/30206 709/230 |
| 2008/0059631 A1 | 3/2008 | Bergstrom et al. | |
| 2008/0133538 A1 | 6/2008 | Chavez et al. | |
| 2008/0287058 A1* | 11/2008 | Nahm | G06F 8/65 455/3.02 |
| 2010/0169442 A1 | 7/2010 | Liu et al. | |
| 2011/0055312 A1 | 3/2011 | Purdy | |
| 2011/0072075 A1 | 3/2011 | Gautier | |
| 2011/0238756 A1 | 9/2011 | Damola et al. | |
| 2013/0097644 A1 | 4/2013 | Brande et al. | |

OTHER PUBLICATIONS

Dale, et al., "Apt-P2p: A Peer-to-Peer Distribution System for Software Package Releases and Updates", In Proceedings of 28th IEEE International Conference on Computer Communications, Apr. 19, 2009, pp. 864-872.

Warren, Tom, "Microsoft to Deliver Windows 10 Updates Using Peer-To-Peer Technology", Published on: Mar. 15, 2015, Available at: http://www.theverge.com/2015/3/15/8218215/microsoft-windows-10-updates-p2p.

Maymounkov, et al., "A Peer-to-Peer Information System Based on the XOR Metric", In Proceedings of First International Workshop on Peer-to-Peer Systems, Mar. 7, 2002, 13 pages.

International Preliminary Report on Patentability issued in Published PCT Application No. PCT/US2016/031080 dated Jun. 22, 2017.

* cited by examiner

DYNAMIC SWARM SEGMENTATION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, near field communication, or even computer to computer connections through serial, parallel, USB, or other connections. The connections allow a computing system to access services at other computing systems and to quickly and efficiently receive application data from other computing systems.

Interconnection of computing systems has facilitated the ability to implement peer-to-peer communication systems where peer computing systems can communicate and share digital content with each other. In traditional peer-to-peer systems, peers request digital content from each other. Often, peers can trade content with each other. For example, consider a set of data which may include pieces A, B, C, D and E. One peer may have pieces A, B, and E, while another peer has A, B, C, and D. The first peer could provide piece E to the second peer and the second peer could provide pieces C and D to the first peer. Thus, peers are often matched by the fact that they have a piece of content.

However, it is often the case that a single piece of content represents the full set of content, yet there are many different ways that a peer needs to consume that content, each of which require a different set of bytes. Imagine a case where there is a need to update a binary set of data that represents a full update for an operating system. However, some peers will only update an integrated browser, some will update an integrated word processor and some will update an integrated calculator. This creates different required portions (typically divided by byte ranges) from the update binary, some of which may not even overlap. If there is no overlap, this creates ineffective peers, as there are no bytes to trade in either direction. The degree of overlap dictates how effective peer-to-peer will be.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A method includes acts for identifying peers to a client for the client to obtain data. The method includes receiving from the client an identification of a dataset and a specification of one or more byte ranges of the dataset. As a result, the method further includes identifying one or more other clients associated with the one or more byte ranges of the dataset to act as peers to the client. The method further includes providing an indication of the one or more other identified clients as peers to the client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered as limiting in scope, embodiments will be described and explained with additional specificity and detail through the use of the accompanying drawings in which.

DETAILED DESCRIPTION

Some embodiments herein implement a system whereby effective peers can be identified for each other, or in some cases, in at least one direction. In particular, embodiments can identify clients that use the same subset of pieces of a dataset and facilitate matching them as peers.

This could be done by using a tree or graph representation of the dataset, where at a highest level of the graph is a node that represents the entirety of the dataset including all pieces of the dataset. Child nodes in the graph represent subsets of pieces of the pieces of their parents. Clients that use pieces of the dataset are placed into groups associated with certain sets of pieces based on what pieces are appropriate for the clients. Thus, clients that use the same set of appropriate pieces can be matched to each other as peers to create efficient peer-to-peer sharing. In the alternative, one client associated with a first node could be matched as a peer to a client associated with a second node that is a parent of the first node if a peer associated with the same node as the first node is not (or cannot be) provided. Thus, while this may not be efficient for both clients, at least one of the clients will have a peer that uses all of the pieces that the client uses.

Figure 1:
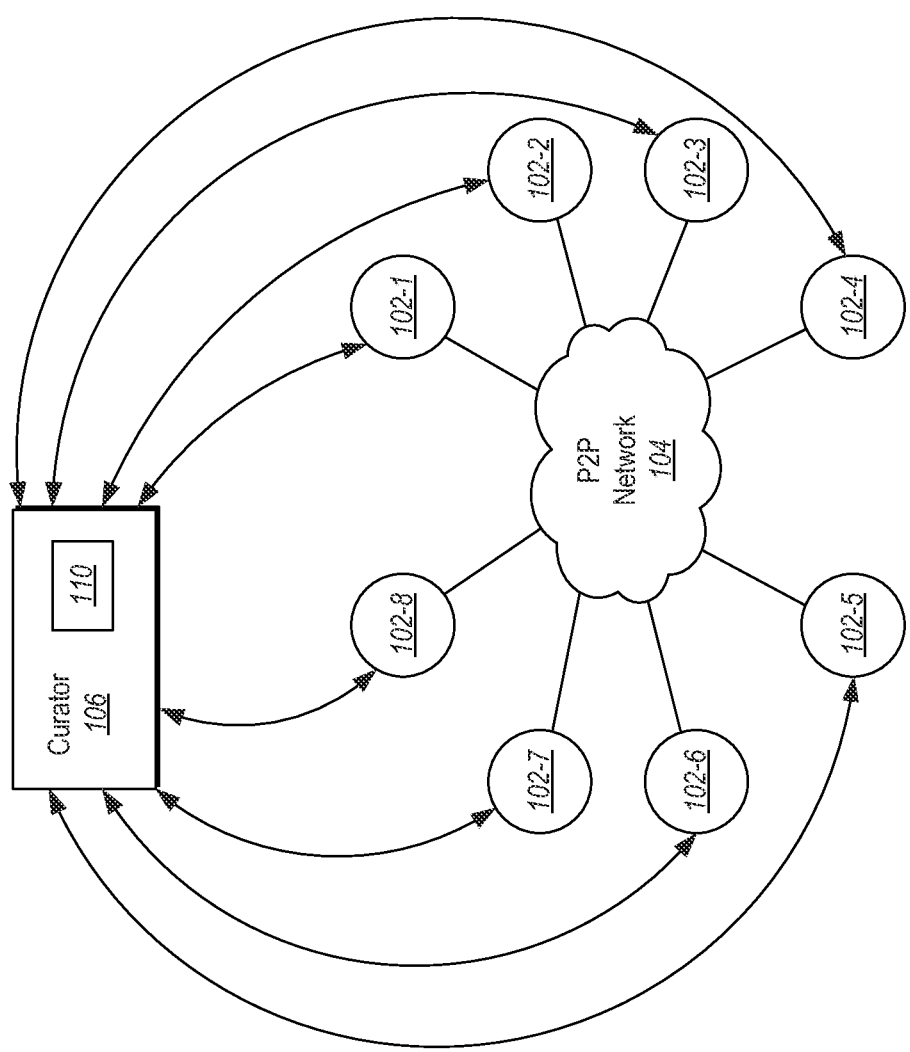
FIG. 1 illustrates a peer to peer network that facilitates client updates.

FIG. 1 illustrates an example. In the example illustrated in FIG. 1. A plurality of clients 102-1 through 102-8 are connected in a peer to peer network 104. The clients in the peer to peer network 104 may each need some data for an update to the client. The data needed by each client is contained in an overall dataset 202 (see FIG. 2A). However, each client likely only needs a portion (illustrated in some specific examples below as data corresponding to a byte range) of the data in the overall dataset 202.

Figure 2A:
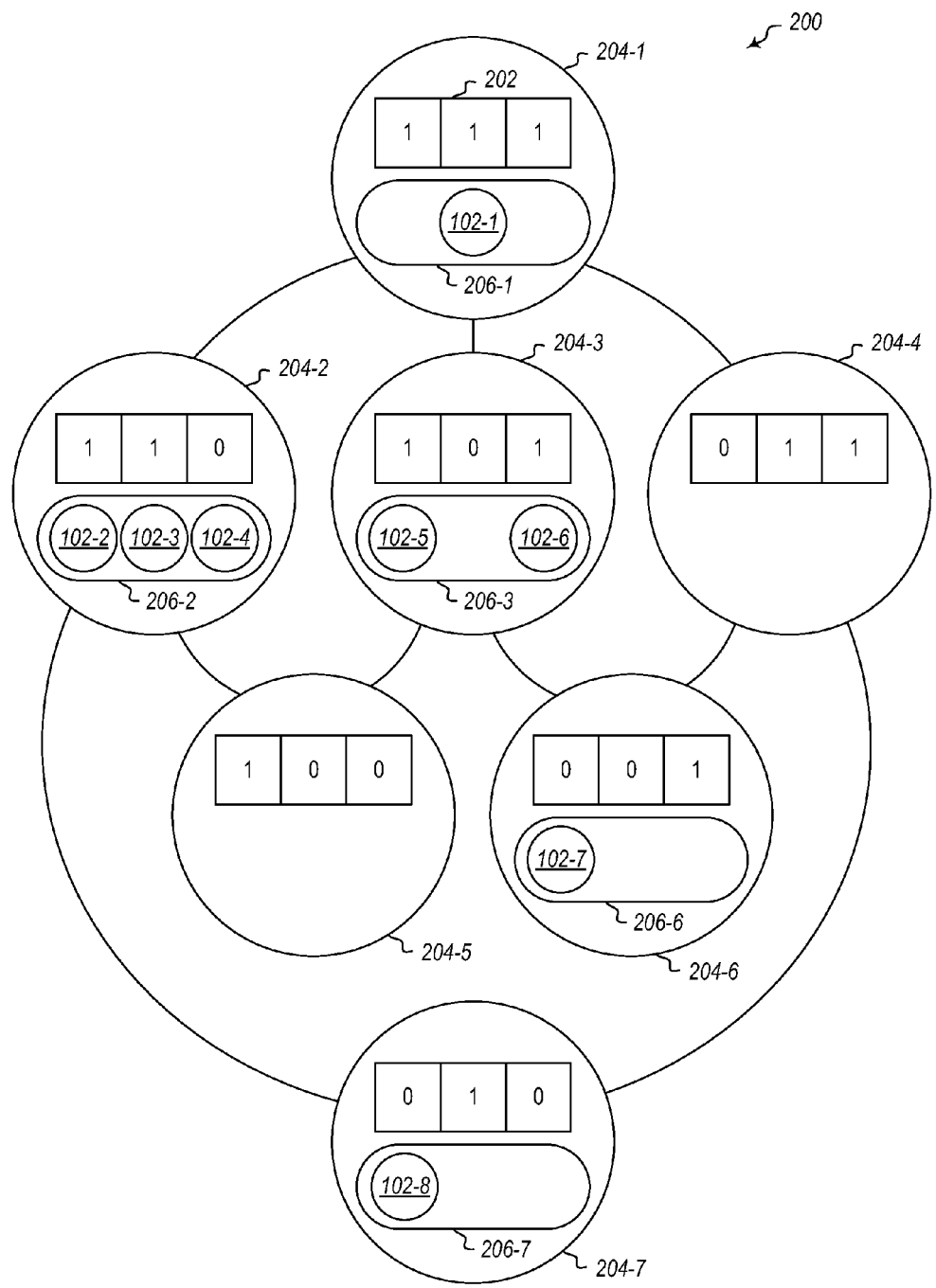
FIG. 2A illustrates a graph that can facilitate finding peers for clients.

FIG. 2A illustrates an example where the overall dataset 202 is divided into three pieces. Each of the clients in the peer to peer network 104 needs one or more, but not necessarily all, of the three pieces. Note that while three pieces are illustrated in FIG. 2A, it should be appreciated that other divisions and numbers of pieces may be included in an overall dataset.

FIG. 2A illustrates a graph 200 showing a hierarchical illustration of how the three different pieces might be divided into various nodes 204-1 through 204-7. In particular, node 204-1 includes all three pieces of the overall dataset 202. Node 204-2 includes the first and second pieces of the overall dataset 202. Node 204-3 includes the first and third pieces of the overall dataset 202. Node 204-4 includes the second and third pieces of the overall dataset 202. Node 204-5 includes the first piece of the overall dataset 202. Node 204-6 includes the third piece of the overall dataset 202. Node 204-7 includes the second piece of the overall dataset 202.

FIG. 2A further illustrates that the clients illustrated in FIG. 1 are organized into groups corresponding to nodes of the graph 200. Each client is placed into a group according to the pieces of the overall dataset 202 that the client needs for the update. Thus, client 102-1 is placed into group 206-1 corresponding to node 204-1 because client 102-1 needs all three pieces of the overall dataset 202 to update. Clients 102-2, 102-3 and 102-4 are placed into group 206-2 corresponding to node 204-2 because clients 102-2, 102-3 and 103-4 need the first and second pieces of the overall dataset 202 to update. Clients 102-5 and 102-6 are placed into group 206-3 corresponding to node 204-3 because clients 102-5 and 102-6 need the first and third pieces of the overall dataset 202 to update. Client 102-7 is placed into group 206-6 corresponding to node 204-6 because client 102-7 needs the third piece of the overall dataset 202 to update. Client 102-8 is placed into group 206-7 corresponding to node 204-7 because client 102-8 needs the second piece of the overall dataset 202 to update.

Based on this information, clients 102-2, 102-3 and 102-4 can be identified as potential ideal peers for one or more of each other because they each need the same portions of the overall dataset 202 and thus are in the same group 206-2. Similarly, clients 102-5 and 102-6 are potential ideal peers because they each need the same portions of the overall dataset 202 and thus are in the same group 206-3. Embodiments may prefer an ideal peer set because if embodiments use peers from a group higher in the hierarchy of the graph, those peers may not be able to serve other clients for which it may be more efficient.

Client 102-7 does not have any other clients in its same group 206-6, and therefore will be matched with a non-ideal peer, but with one that includes the portions of the overall dataset that it needs.

Peers for client 102-7 can be identified by traversing the graph 200 to find parent nodes associated with groups having clients needing the appropriate portions of the overall dataset 202. For example, node 204-3 is a parent of node 204-6. Node 204-3 is associated with group 206-3 which contains clients 102-5 and 102-6. As such, one or both of clients 102-5 and 102-6 could be identified as peers for client 102-7. They will be ideal peers for client 102-7, however, client 102-7 will not be an ideal peer for clients 102-5 and 102-6 because it does not need the first portion of the overall dataset 202.

Alternatively, the graph 200 could be traversed to identify node 204-1, which is not an adjacent parent of node 204-6 (i.e. immediately hierarchically above), but is a more distant parent hierarchically above node 204-6. Client 102-1 could be identified this way as being a client that could be a peer for node 102-7. Again, client 102-1 would be an ideal node for client 102-7, but client 102-7 would not be an ideal peer for client 102-1 because client 102-1 needs all three portions and client 102-7 only needs the third portion of the overall dataset 202.

It should be appreciated, that given a choice between selecting clients 102-5 and 102-6 versus client 102-1 as peers for node 102-7, some embodiments will select clients 102-5 and 102-6 as the peers as it leaves client 102-1 available as a peer for other clients that need the same pieces of the overall dataset 202, or at least more of the pieces of the overall dataset 202 than client 102-7. In particular, it may be useful to distribute load efficiently amongst clients by selecting clients that are most similar to each other in terms of needs for portions of an overall dataset to be peers.

For example, client 102-1 could be an ideal peer for any client, but would become overloaded if all clients were assigned to it as peers. It may be more efficient, in some embodiments, to assign client 102-1 to peers where no other peer is available. Of course this can be modified in some embodiments where other factors out-weigh having the most similar clients as peers in terms of needs for portions of an overall dataset. For example, if it is anticipated that only small amounts of overall peer traffic will be needed to update all clients, finding a most similar client as a peer may be de-emphasized.

In addition to similarity with respect to needed portions of an overall dataset, clients may be evaluated for other factors when determining if they should be assigned as peers. A similar client may be disqualified as a peer (or be de-emphasized for selection as a peer) for other peers of identical similarity or even less similarity based on various factors. For example, a most similar client may be disqualified or de-emphasized as a result of the peer using an expensive or less reliable network connection, such as cellular, etc. A most similar client may be disqualified or de-emphasized as a result of the peer being powered by battery power as opposed to a power connection coupled to a public power utility. A most similar client may be disqualified or de-emphasized as a result of having limited storage space. A most similar client may be disqualified or de-emphasized as a result of having an existing high workload. A most similar client may be disqualified or de-emphasized as a result of having lower computing capacity. A most similar client may be disqualified or de-emphasized as a result of having lower network or workload bandwidth. A most similar client may be disqualified or de-emphasized as a result of having limited amounts of system memory. A most similar client may be disqualified or de-emphasized as a result of a load-balancing fairness algorithm that attempts to evenly distribute peer loads. De-emphasizing may cause certain clients to be weighted less and thus, be less likely to be selected as peers for other clients.

Conversely, client may be emphasized or weighted higher for selection as a peer due to one or more factors. For example, a client may be emphasized for selection as a peer due to having a high bandwidth or low cost network connection. A client may be emphasized for selection as a peer due to being connected to a public utility power source as opposed to batter power. A client may be emphasized for selection as a peer due to have a large amount of storage space. A client may be emphasized for selection as a peer due to having a low workload presently being executed by the client. A client may be emphasized for selection as a peer due to a determination by some fairness algorithm. A client may be emphasized for selection as a peer due to having some special means of communication, such as near field communication or other desirable communication. A client may be emphasized for selection as a peer due to logical proximity to other clients. Etc.

Illustrating now additional details, embodiments can encode byte ranges of an overall dataset as a mask. This mask can represent a virtual group identifier. For example, the first second and third portions of the overall dataset 202 may each be byte ranges. A group with all three portions may be identified by the virtual group identifier 111 representing all three portions. A group with only the first portion may be identified by the virtual group identifier. Etc. In this example, a "1" included in a group identifier indicates the presence of the byte range corresponding to that portion of the group identifier, whereas a "0" represents the absence of the corresponding byte range.

Clients in a given group are ideal peer matches for each other. If there is another group which supersedes the pieces in this group (i.e. a hierarchical parent, whether adjacent or more distant), it would also have clients that would be an ideal match for clients in this group, but not the other way around. Based on this relationship, a graph (such as the graph 200) can be built where any child node is a subset of its parent(s). With this hierarchy, embodiments are able to efficiently find perfect peer matches by traversing up the graph.

Figure 3:
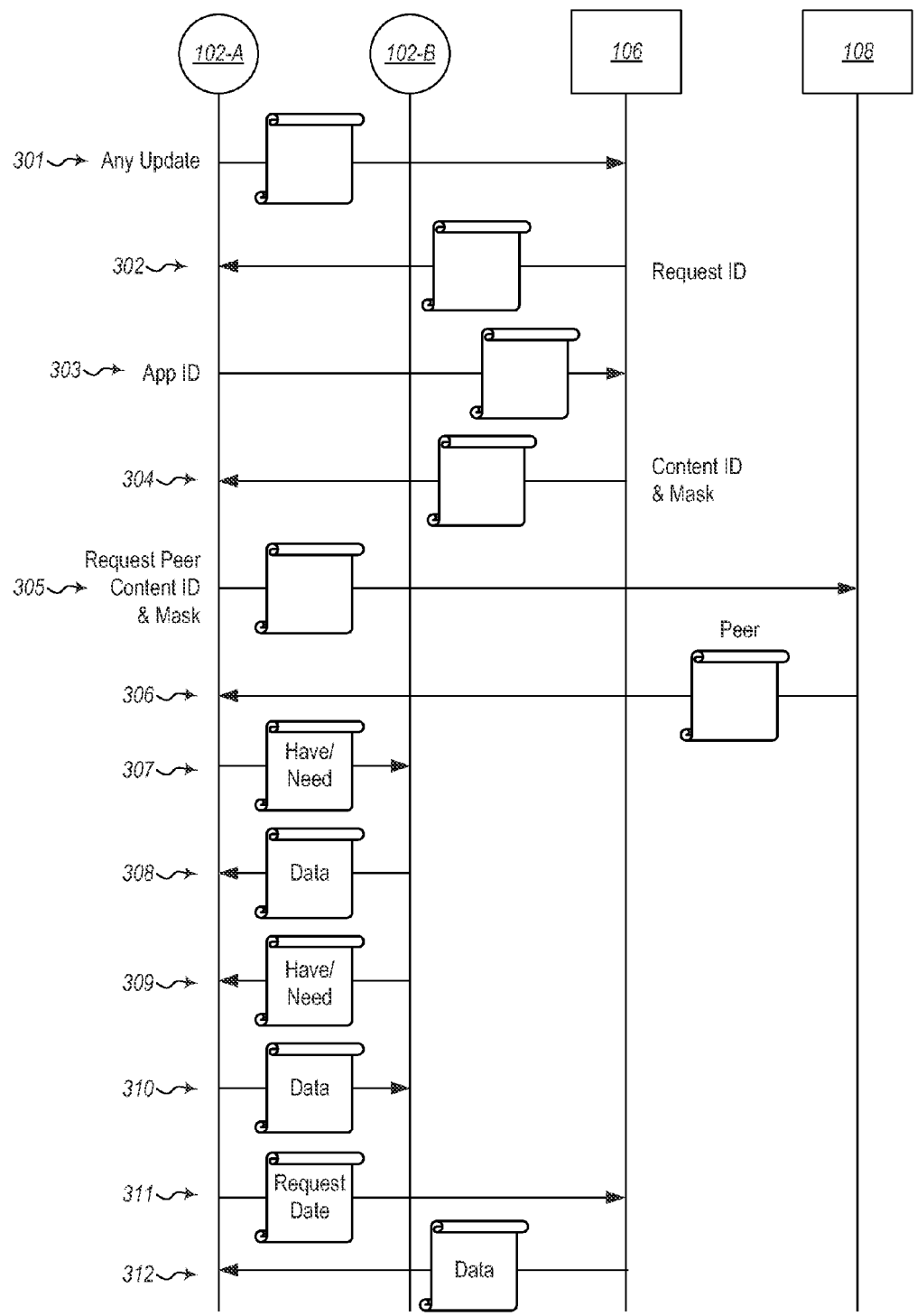
FIG. 3 illustrates a data flow for identifying peers for a client and updating the client.

Referring now to FIG. 3, a data flow is illustrated. The data flow shows communications for two clients 102-A and 102-B, a data curator 106 and a peer determination service 108. It should be appreciated that the peer determination service 108 may be included as part of the data curator 106 or as a separate service.

In the example shown in FIG. 3, at 301, a first client 102-A sends a message to the data curator 106 querying to discover if there are any updates for the client 102-A. At 302, the data curator 106 replies with a message requesting an identification of applications to update. At 303, the client 102-A sends a message application, an operating system, installed drivers, hardware at the client 102-A, etc. In response, at 304, the data curator sends a content identifier and a mask. The content identifier identifies the overall dataset needed for updating applications at the client 102-A and the mask identifies which portions of the overall dataset are needed for updating. In some embodiments, the mask may be a binary bitmap of the overall dataset. In particular, the dataset may be divided into byte ranges corresponding to bits in the bitmap. Setting a bit in the bitmap mask (e.g. setting the bit to 1 in the examples illustrated previously herein) indicates that the byte range is needed for an update. If the bit is cleared (e.g. the bit is set to 0, as in the examples above), this is an indication that a byte range corresponding to the bit is not needed for the update. Note that while positive logic is shown in the examples above, it should be appreciated that other types of logic may be alternatively used.

Once the client 102-A knows what dataset and which portions of the dataset it needs, it can begin to attempt to identify peers that have and/or need each of the same portions of the dataset. This is begun, as illustrated at 305, by sending a request for peers to the peer determination service 108. The request includes the content identifier and the mask obtained previously (or equivalent information for identifying the dataset and the portions of the dataset needed). The peer determination service 108 can then use this information to identify peers for the client 102-A. Ideally, the peer determination service attempts to identify other clients that, for each of the byte ranges of the overall dataset needed by the client 102-A, either have and/or need exactly the same byte ranges, without needing more or less byte ranges. This can be done by using the mask as a virtual group identifier where all clients needing exactly the same byte ranges will have the same virtual group identifier. However, if the peer determination service 108 is not able to find peer by using a graph, such as the graph illustrated in FIG. 2A. In particular, the graph can be used to identify parent nodes. The parent nodes may be used to identify peers that are similar and need or have all of the data in the byte ranges needed by the client 102-A. In some embodiments, an attempt to identify the most similar clients will be performed. For example, suppose, using the graph of FIG. 2A, that the client 102-A is client 102-7 illustrated in FIG. 2A. Two groups of peers can be identified using the graph, namely group 206-3 and 206-1. However, the clients in group 206-3 are more similar to client 102-7 than the client in group 206-1.

Figure 2B:
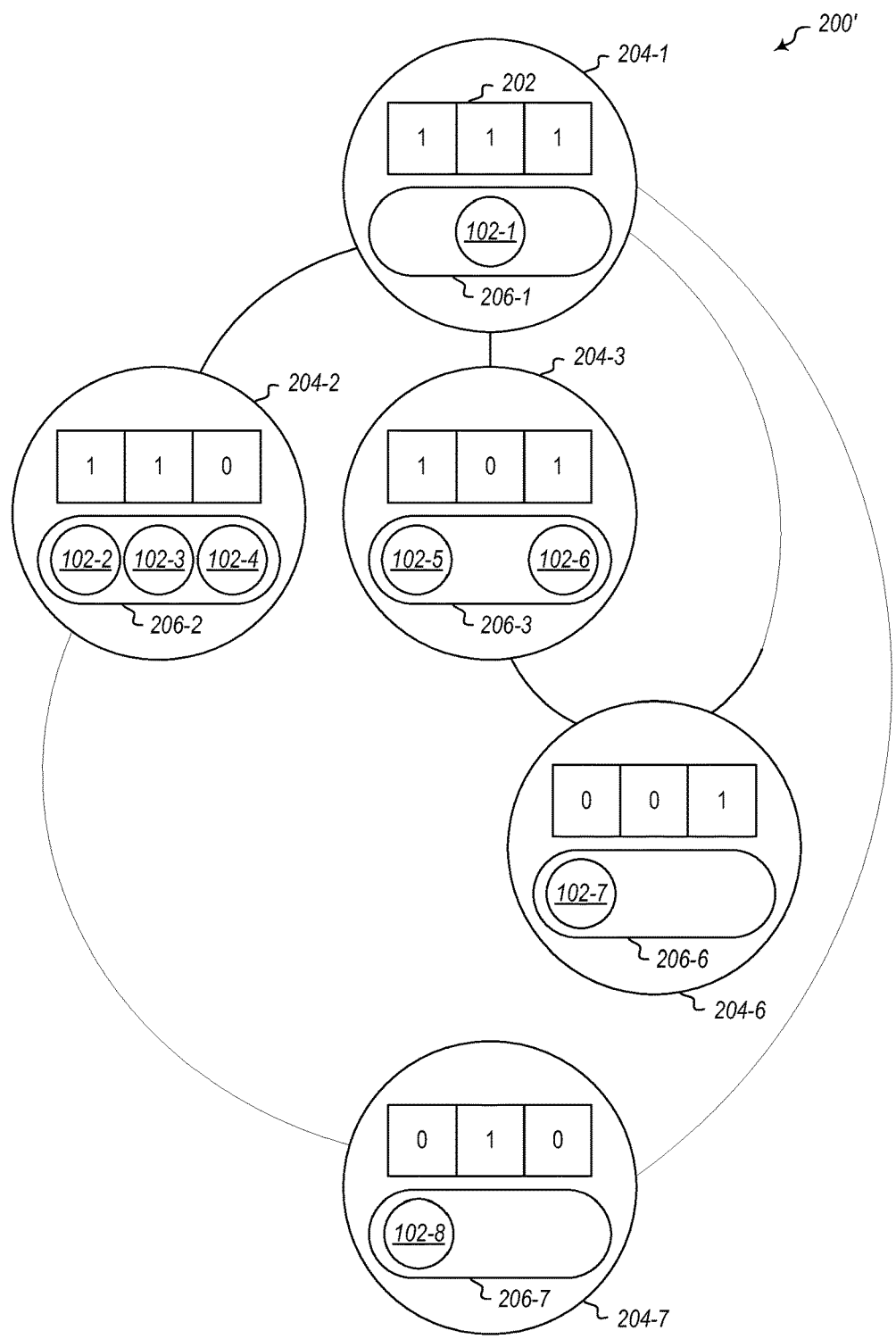
FIG. 2B illustrates an optimized version of the graph in FIG. 2A.

While the graph in FIG. 2A may be used, in other embodiments, as illustrated in FIG. 2B, a graph 200' may only include nodes for which there are client belonging to groups corresponding to nodes. Nodes can be added or trimmed from the graph 200' as needed.

Returning once again to FIG. 3, at 306 the peer determination service 108 identifies client 102-B as a peer to client 102-A. While the example shows only a single peer being identified, it should be appreciated that multiple peers could be identified if so desired. At 307, the client 102-A sends a message to client 102-B identifying the byte ranges for data of the overall dataset that the client 102-A has as well as the byte ranges for data of the overall dataset that the client 102-A needs. In response, as illustrated at 308, the client 102-B can send any of the data indicated by the byte ranges that the client 102-B has and that the client 102-A needs. Additionally, as illustrated at 309, the client 102-B can send a message to client 102-A identifying the byte ranges for data of the overall dataset that the client 102-B has as well as the byte ranges for data of the overall dataset that the client 102-B needs. As illustrated at 310, the client 102-A can send any data it has that is needed by the client 102-B in response.

If a client is not able to obtain needed data from other peers, the client can contact the curator 106 to obtain data as illustrated at 311. The curator 106 can return the requested data to the client 102-A as illustrated at 312. The client 102-A now has this data available to share with other peers. The client 102-A may request one or more byte ranges of data from the curator 106 without requesting all data needed. In particular, the client 102-A may attempt to obtain data from peers first and then attempt to obtain data, on a byte range basis, from the curator 106.

In some embodiments, a client may later discover that it needs data from more byte ranges than originally anticipated and as such, will be moved into a different container. For example, the client may identify that new hardware is installed, that new applications have been added, that new features have been added, etc. The client can contact the curator 106 to discover if any additional data is required. The curator 106 can identify a new mask with additional byte ranges. At this point, the client may have already obtained some of the data, but still needs new data, including new data associated with newly identified byte ranges. The curator 106 will identify for the client a mask that includes byte ranges for the data that the client has already obtained in addition to the byte ranges for data that the client still needs. The client can attempt to identify new peers by contacting the peer determination service 108 and providing the new mask, which can be used as part of a group identifier to identify a new group for the client. The client can be added to the new group and peers identified from that group (or from a group hierarchically above the client's group). The client can then provide and receive data from the identified peers.

For example, and with respect to FIG. 2A, consider a case where the client 102-8 is originally placed in the group 206-7 based on a mask of 010 indicating that the client 102-8 needs the second portion of the overall dataset 202. However, at a later time, after the client 102-8 has already obtained the second portion of the overall dataset, the client 102-8 may determine that it also needs the first portion of the overall dataset, as a result of determining that an update is needed and then contacting the curator 106. The client 102-8 can then contact the peer determination service 108 which identifies a group identifier of 110 corresponding to the data from the overall dataset 202 already received by the client 102-8 and an additional portion of the overall dataset 202 still needed by the client 102-8. The client 102-8 will therefore be added to the group 206-2 and one or more peers will be identified for the client 102-8. Processing proceeds as previously discussed herein.

Thus, embodiments may implement a system in which content identifiers can be dynamically created based on byte ranges. Using the content identifiers, the byte ranges for a client are used to match peers. The byte range may be content that is needed or in some cases, content that the client already has, as will be explained in more detail below. As noted above, content identifiers can be stored in a graph structure. The content identifier graph can be traversed to find peers. As noted above, the byte ranges associated with a child node in the graph are a subset of the byte ranges associated with a parent node. Embodiments may be implemented where new byte range content identifiers can be inserted into the graph. Additionally, new byte range content identifiers can be deleted into the graph.

Illustrating now a detailed example, operating system updates, such as updates to the Windows operating system from Microsoft Corporation of Redmond, Wash., are delivered to client machines as large files, from which, individual machines pick and choose byte ranges that are required for a successful install or patch. These byte ranges vary depending on the configuration of each client machine (installed software, patches, previous updates, drivers, etc.). Currently, these large files are distributed in their entirety, which causes enormous strain on the content delivery networks (CDNs) (in terms of cost and bandwidth), but in reality, only parts of the file are actually required. However using the peer-to-peer technology described above, embodiments can dynamically group clients based on an appropriate consumption pattern, and connect peers with similar consumption profiles needs, so that only peers with unique sparse data are transferring bits. This helps to limit unnecessary data from being transferred.

Figure 4:
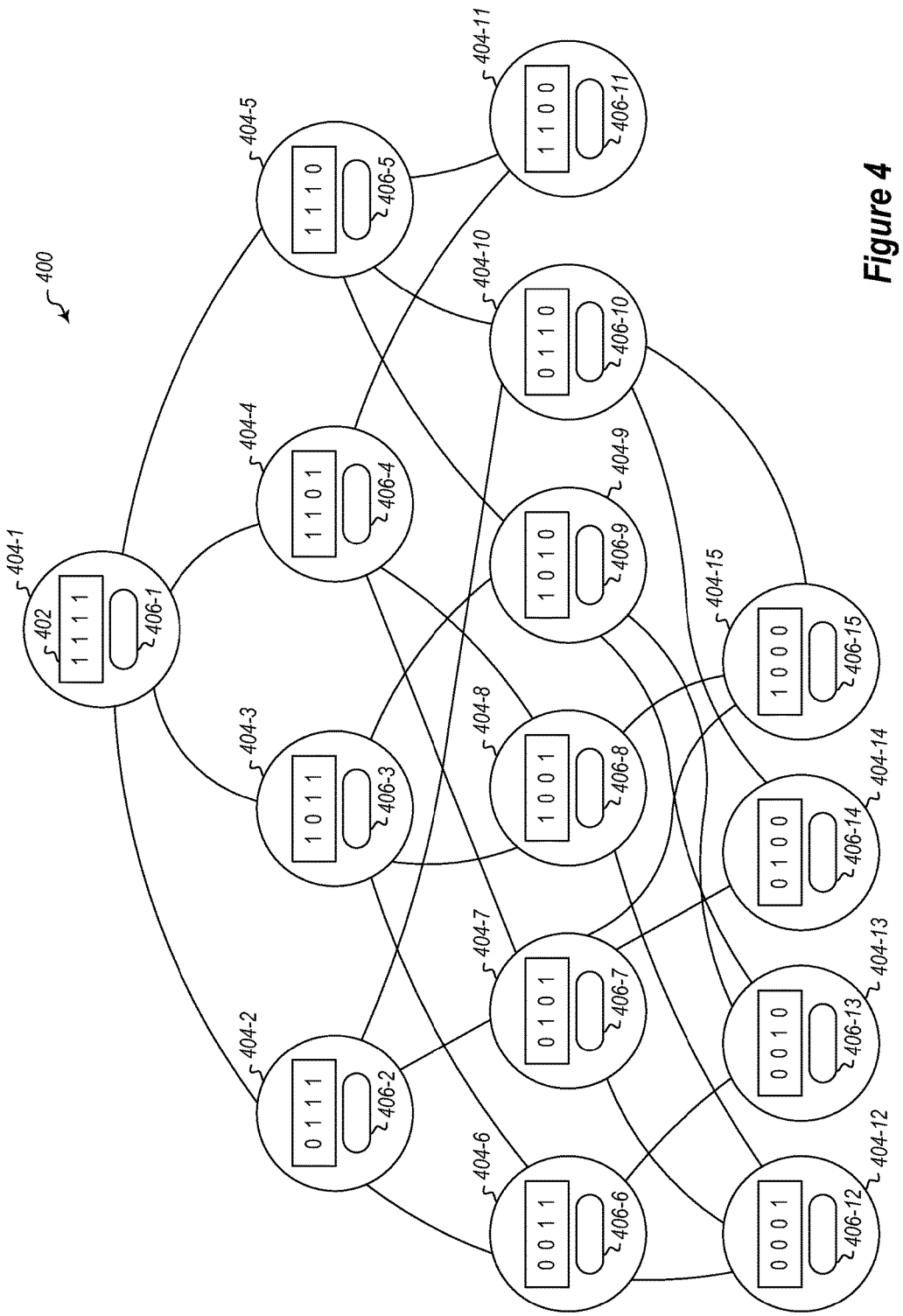
FIG. 4 illustrates another example of a graph that can facilitate finding peers for clients.

Referring now to FIG. 4, an alternate version is illustrated. FIG. 4 is used to illustrate an example where needed byte ranges of an overall dataset may change and may not be known by the client. In some embodiments, this may occur due to user choices that change a user experience on a client. For example, consider an application where a user uses an application on a client to participate in a virtual tour or other simulation. The user can make choices that will change what data is needed by the client. Some embodiments may use predictive technology to identify needed updates. The predictive technology may use information about what portions of an overall dataset a client already has. Additionally, the predictive technology may use other input, such as input regarding choices made by a user, characteristics of a client machine, or even external factors such as network connectivity, time of day, or other factors to predict which additional portions a client may need.

In the example illustrated in FIG. 4, a graph 400 is illustrated having a plurality of nodes 404-1 through 404-15. Each of the nodes is associated with a group 406-1 through 406-15 respectively. Each group defines a set of clients. Any given client may move to different groups over time. For example, a client may have a mask of 0001 indicating that it needs the fourth portion of an overall dataset 402. As a result, the client may be placed into group 406-12 and one or more peers identified from either the same group 406-12, or from a group associated with a parent node to the node 404-12 (i.e. one of nodes 404-6, 404-7, 404-8, 404-2, 404-3, 404-4, or 404-1). The client will at some point obtain the fourth portion of the overall dataset 402, either from a peer or from a curator 106. The client can then identify to the curator 106 that it has the fourth portion of the overall dataset 402. In some embodiments, the client may also identify various user interactions at the client or other information to the curator 106. The curator 106 can then determine using predictive technology that the client is likely to need, for example, the second portion of the overall dataset 402 as well. A peer selection service 108 can move the client to the group 406-7, which is the group associated with the mask 0101 identifying the second and fourth portions of the overall dataset 402. New peers can be identified for the client as illustrated above based on the assignment to a new group.

At a later time, based on the client having obtained the second and fourth portions of the overall dataset 402, the curator may determine, based on predictive reasoning, that the client will likely also need the first portion of the overall dataset 402. As a result, the client will be moved to the group 406-4 based on a group identifier and/or mask of 1101.

Various features may be implemented in some embodiments. For example, in some embodiments, membership in a group may be evaluated periodically. Thus, for example, every n-minutes, the curator 106 use a prediction module 110 to predict new masks and corresponding group identifiers for clients. The clients may be moved into the different groups based on the predictions. Thus, groups may change over time. Or in non-predictive embodiments, client update needs may be evaluated periodically.

In some embodiments, nodes may be added or removed from a graph as group membership changes. For example, if a group has no membership, the node may be removed from the graph by simply connecting any child nodes of the empty node to parent node or nodes of the empty node. An example of this is illustrated by the differences between FIG. 2A and FIG. 2B. If node 204-4 were removed from the graph 200, the child node 204-7 of node 204-4 would simply be connected to the parent node 204-1 of node 204-4. This could make traversing the graph 200' to identify peers simpler as fewer nodes would need to be traversed to find parent nodes associated with groups having members that could be peers for a client. Nodes may be added as corresponding groups are created in a similar manner (except in reverse).

Some embodiments could further be optimized be removing groups and/or nodes from a graph when there are sufficient numbers of clients in a group for a parent node. For example, in a simulation environment, many client machines will gradually move from the bottom portions of a hierarchy to portions closer to the top of the hierarchy. When large numbers of clients are moved to corresponding groups in higher portions of the hierarchy, lower nodes of the graph (and corresponding groups) could be eliminated. In this case, some clients may not be added to a group, but rather one or more peers could be selected from groups with clients having an appropriate byte mask. Thus, for example, a new client may be added which needs the first portion of the overall dataset 402 and thus has a byte mask of 1000. Assume that over time, a large number of clients have been added to the group 406-3. Because of the large number of clients in this group, there is little concern with the clients being overloaded or with needing to save the clients as peers for other clients. Thus, the graph 400 may be pruned to eliminate notes 404-6, 404-8, and 404-9 and any child nodes to these nodes (as well as their corresponding groups). Node 404-3 may then be specified as the entry point for any new client have a byte mask of 1011, 0011, 1001, 1000, 0001, 1010, and 0010. Thus, the new client with a byte mask of 1000 could be directly paired with one or more peers in the group 406-3. Note that several nodes may have sufficient clients in their group and may cover overlapping byte masks. In such case various load balancing or random distribution techniques could be used to identify groups and clients for peers.

The following discussion now refers to a number of methods and method acts that may be performed. Although the method acts may be discussed in a certain order or illustrated in a flow chart as occurring in a particular order, no particular ordering is required unless specifically stated, or required because an act is dependent upon another act being completed prior to the act being performed.

Figure 5:
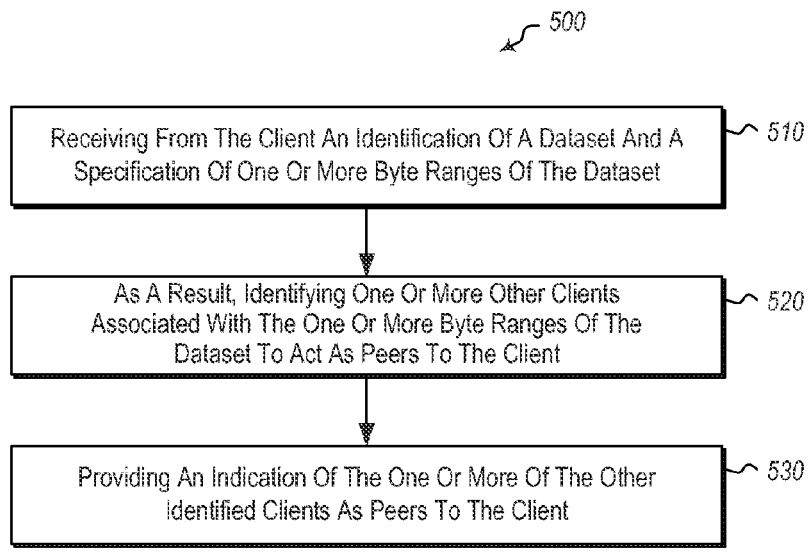
FIG. 5 illustrates a method of identifying peers to a client for the client to obtain data.

Referring now to FIG. 5, a method 500 is illustrated. The method 500 includes acts for identifying peers to a client for the client to obtain data. The method 500 includes receiving from the client an identification of a dataset and a specification of one or more byte ranges of the dataset (act 510). For example, a client may know what dataset it needs for an update, and what byte ranges of the dataset are needed. The client can provide this information to a peer determination service.

As a result, the method 500 further includes identifying one or more other clients associated with the one or more byte ranges of the dataset to act as peers to the client (act 520). For example, the peer determination service may identify one or more other clients that have/need at least the same byte ranges as the client and identify them as peers to the client.

The method 500 further includes providing an indication of the one or more of the other identified clients as peers to the client. Thus, for example, the peer determination service may identify other clients as peers to the client.

The method 500 may be practiced where the indication of one or more of the other identified clients is an identification of one or more peer endpoints The method 500 may be practiced where the one or more other identified clients are associated with exactly the specified one or more byte ranges of the dataset in that the one or more other identified clients are associated with all of the specified one or more byte ranges of the dataset and no additional byte ranges of the dataset. Thus, for example as illustrated above, peers may be selected from the same group of clients, where clients are grouped by what portions of an overall dataset they have/need.

The method 500 may be practiced where the one or more other identified clients are associated with a superset of the specified one or more byte ranges of the dataset such that the one or more other identified clients have all of the one or more specified byte ranges in addition to one or more additional byte ranges of the dataset.

Thus, for example as illustrated above, if a peer cannot be identified from the same group as the client, a peer from a parent group may be selected as clients in the parent group have/need the same portions of the overall dataset as the client, in addition to other portions of the overall dataset.

In some such embodiments, the method 500 may include using a graph to identify the one or more other identified clients by using a virtual content identifier associated with the one or more specified byte ranges to identify an entry node of the graph and traversing the graph upward hierarchically from the entry node to identify clients associated with a superset of the specified one or more byte ranges. Thus, as illustrated above, embodiments could traverse a graph to find parent nodes corresponding with groups to identify groups having a superset of overall dataset portions.

Embodiments using a graph may be implemented where the method 500 further includes optimizing the graph to prune nodes of the graph or to add nodes to the graph. This could be done on the fly as group memberships disappear or as groups are formed. Alternatively, this could be performed periodically during an optimization cycle to identify nodes that need to be pruned or added based on changing group memberships. As noted above, in some embodiments, even though a group may not be empty, the corresponding node may nonetheless be pruned based on a parent to the node corresponding to a group with a large number of members that would be capable of serving as peers for any members of a group corresponding to the pruned node.

The method 500 may further include using the specification of one or more byte ranges of the dataset to dynamically create a virtual content identifier. For example, as illustrated above, each byte range may be associated with a bit in a mask. The bit may be set if a given byte range is needed. An identifier may be based on the bits that are set.

The method 500 may be practiced where identifying one or more other clients associated with the one or more byte ranges of the dataset to acts as peers to the client comprises identifying clients where for each byte range of data from the dataset, the one or more other clients either have data in the byte range or need data in the byte range. Alternatively, the method 500 may be practiced where identifying one or more other clients associated with the one or more byte ranges of the dataset to act as peers to the client comprises identifying clients already having all data from the dataset in the one or more byte ranges. Thus, in some embodiments, rather than looking for peers that have/need data, embodiments can attempt to only identify peers that have certain data.

Figure 6:
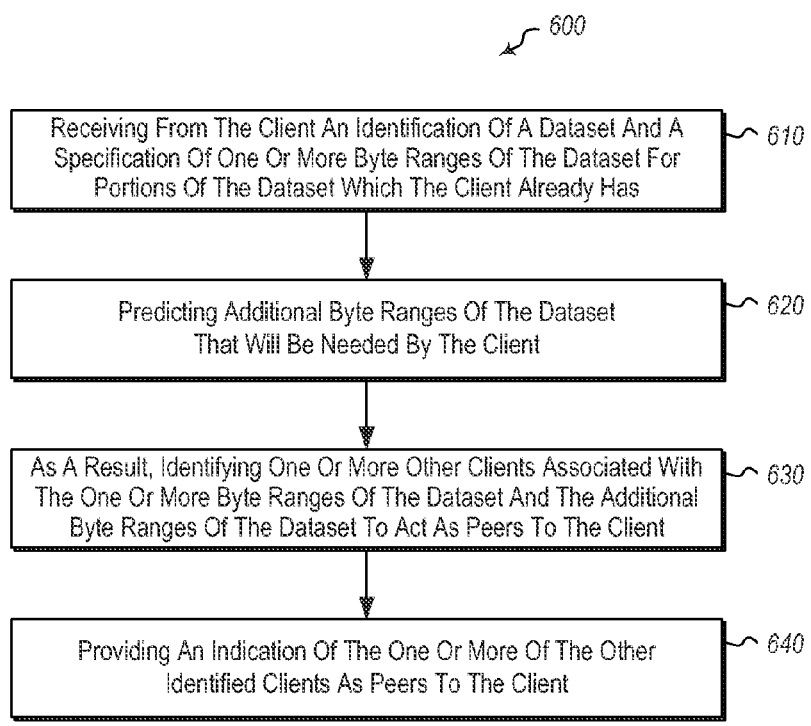
FIG. 6 illustrates another method of identifying peers to a client for the client to obtain data.

Referring now to FIG. 6, a method 600 is illustrated. The method includes acts for identifying peers to a client for the client to obtain data. However, in contrast to the method illustrated in FIG. 5, predictive algorithms may be used to determine what data a client likely needs. The method 600 includes receiving a from the client an identification of a dataset and a specification of one or more byte ranges of the dataset for portions of the dataset that the client already has. Thus, for example, a client may identify to a peer determination service that the client has certain portions of an overall dataset.

The method 600 further includes predicting additional byte ranges of the dataset that will be needed by the client. This can be based on the byte ranges that the client already has. Alternatively or additionally, this may be based on other user input or other factors.

As a result, the method 600 further includes identifying one or more other clients associated with the one or more byte ranges of the dataset and the additional byte ranges of the dataset to act as peers to the client. For example, embodiments may identify other clients that have/need the byte ranges of the overall dataset that the client has as well as the byte ranges predicted to be needed by the client.

The method 600 further includes providing an indication of the one or more other identified clients as peers to the client. Thus, for example, embodiments can identify to the client other clients that can act as peers.

The method 600 may be practiced where the acts are repeated periodically for the same client as the client obtains additional data from the dataset. Thus, for example, in a simulation embodiment, new data may periodically be needed. As a result, the various acts can be repeated to obtain new portions of the overall dataset.

The method 600 may be practiced where the one or more other identified clients are associated with the one or more specified byte ranges of the dataset and the predicted additional byte ranges of the dataset in that the one or more other identified clients are associated with all of the one or more specified byte ranges of the dataset and the predicted additional byte ranges of the dataset and no additional byte ranges of the dataset. In this case an "ideal peer" is identified. Thus, for example as illustrated above, peers may be selected from the same group of clients, where clients are grouped by which portions of an overall dataset they have/ need.

The method 600 may be practiced where the one or more other identified clients are associated with a superset of the one or more specified byte ranges of the dataset and the predicted additional byte ranges of the dataset in that the one or more other identified clients are associated with all of the one or more specified byte ranges of the dataset and the predicted additional byte ranges of the dataset in addition to one or more further additional byte ranges of the dataset.

The method 600 may further include, using a graph to identify the one or more other identified clients by using a virtual content identifier associated with the one or more specified byte ranges and the predicted additional byte ranges to identify an entry node of the graph and traversing the graph upward hierarchically from the entry node to identify clients associated with a superset of the one or more specified byte ranges of the dataset and the predicted additional byte ranges of the dataset. As illustrated previously, embodiments may allow a method to optimize the graph to prune nodes or add nodes to the graph.

The method 600 may be practiced where identifying one or more other clients associated with the one or more byte ranges of the dataset and the additional byte ranges of the dataset to act as peers to the client comprises identifying clients where for each byte range of data from the dataset, the one or more other clients either have data in the byte range or need data in the byte range.

Figure 7:
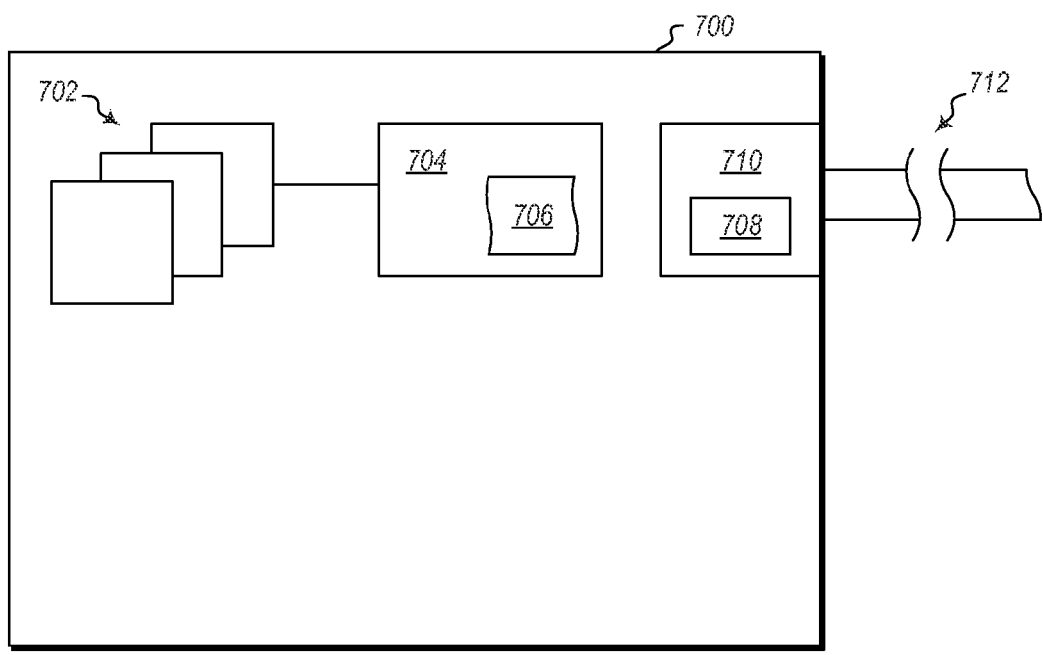
FIG. 7 illustrates a system where embodiments may be practiced.

With reference to FIG. 7, the methods may be practiced by a computer system 700 including one or more processors 702 and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer system 700 including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system 700. Computer-readable media that store computer-executable instructions are physical storage media (such as media 704). Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media 704 includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network 712 and/or data links which can be used to carry the desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM 708 within a network interface module 710 (e.g., a "NIC"), and then eventually transferred to computer system RAM and/or to less volatile computer-readable physical storage media (such as media 704) at a computer system 700. Thus, computer-readable physical storage media can be included in computer system components that also (or even primarily) utilize transmission media.

Computer-executable instructions 706 comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as examples of implementing the claims.

Those skilled in the art will appreciate that the invention may be practiced in network computing environments with many types of computer system configurations, including but not limited to, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, but without limitation, illustrative types of hardware logic components that can be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system configured to identify peers for a plurality of clients to facilitate obtaining updates for the plurality of clients, the system comprising:
   one or more processors;
   one or more computer-readable media coupled to the one or more processors;
   wherein the one or more processors and one or more computer-readable media are configured to implement a peer determination service, wherein the peer determination service is configured to:
      identify a dataset associated with the plurality of clients, the dataset comprising a plurality of byte ranges;
      identify, for each given client of the plurality of clients, one or more byte ranges of the plurality of byte ranges of the dataset that each given client has already obtained;
      identify, for each given client of the plurality of clients, one or more byte ranges of the plurality of byte ranges of the data set that each given client needs to obtain; and
      based on the identification of byte ranges, organize the plurality of clients into a plurality of groups, each group both including one or more clients and corresponding to a different node of a hierarchical graph, each given node being associated with one or more byte ranges of the plurality of byte ranges of the dataset, such that each client of a group corresponding to the given node has already obtained or needs to obtain at least one byte range of the one or more byte ranges associated with the given node, at least one client of each group being configured to act as a peer to other clients of the group, the hierarchical graph comprising a plurality of nodes that range from one or more nodes having a smallest number of byte ranges to one or more nodes having a largest number of byte ranges, such that the hierarchical graph can be traversed from the one or more nodes having the smallest number of byte ranges to the one or more nodes having the largest number of byte ranges.

2. The system of claim 1, wherein each of the one or more clients, of a given group corresponding to a given node that is associated with one or more byte ranges, have already obtained or need to obtain exactly the one or more byte ranges associated with the given node and no additional byte ranges of the dataset.

3. The system of claim 1, wherein at least one of the one or more clients, of a given group corresponding to a given node that is associated with one or more byte ranges, has already obtained or needs to obtain a superset of the one or more byte ranges associated with the given node, such that the at least one client has already obtained or needs to obtain all of the one or more byte ranges associated with the given node, in addition to one or more additional byte ranges of the dataset.

4. The system of claim 3, wherein the peer determination service is further configured to use a virtual content identifier to identify the one or more byte ranges that each given client has already obtained or needs to obtain.

5. The system of claim 4, wherein the peer determination service is further configured to optimize the graph to prune nodes of the graph.

6. The system of claim 1, wherein the peer determination service is further configured to use the identified one or more byte ranges of the dataset to dynamically create a virtual content identifier.

7. The system of claim 1, wherein the dataset is encoded as a mask that represents a virtual group identifier for each group of the one or more groups.

8. A method of identifying peers for a plurality of clients to facilitate obtaining updates for at the plurality of clients, the method comprising:
   identifying a dataset associated with the plurality of clients, the dataset comprising a plurality of byte ranges;
   identifying, for each given client of the plurality of clients, one or more byte ranges of the plurality of byte ranges of the dataset that each given client has already obtained;
   identifying, for each given client of the plurality of clients, one or more byte ranges of the plurality of byte ranges of the data set that each given client needs to obtain; and
   based on the identification of byte ranges, organize the plurality of clients into a plurality of groups, each group both including one or more clients and corresponding to a different node of a hierarchical graph, each given node being associated with one or more byte ranges of the plurality of byte ranges of the dataset, such that each client of a group corresponding to the given node has already obtained or needs to obtain at least one byte range of the one or more byte ranges associated with the given node, at least one client of each group being configured to act as a peer to other clients of the group, the hierarchical graph comprising a plurality of nodes that range from one or more nodes having a smallest number of byte ranges to one or more nodes having a largest number of byte ranges, such that the hierarchical graph can be traversed from the one or more nodes having the smallest number of byte ranges to the one or more nodes having the largest number of byte ranges.

9. The method of claim 8, wherein the method is repeated periodically for the plurality of clients as the plurality of clients obtain additional data from the dataset.

10. The method of claim 8, wherein additional byte ranges that a client needs to obtain are predicted for at least one client of the plurality of clients.

11. The method of claim 8, wherein each of the one or more clients, of a given group corresponding to a given node that is associated with one or more byte ranges, have already obtained or need to obtain exactly the one or more byte ranges associated with the given node and no additional byte ranges of the dataset.

12. The method of claim 8, wherein at least one of the one or more clients, of a given group corresponding to a given node that is associated with one or more byte ranges, has already obtained or needs to obtain a superset of the one or more byte ranges associated with the given node, such that the at least one client has already obtained or needs to obtain all of the one or more byte ranges associated with the given node, in addition to one or more further additional byte ranges of the dataset.

13. The method of claim 12 further comprising, using a virtual content identifier to identify the one or more byte ranges that each given client has already obtained or needs to obtain.

14. The method of claim 13 further comprising, optimizing the graph to prune nodes of the graph.

15. The method of claim 8 further comprising, using the identified one or more byte ranges to dynamically create a virtual content identifier.

16. A computer program product comprising at least one hardware storage device having stored thereon computer-executable instructions that are executable by one or more processors of a computer system to cause the computer system to identify peers for clients to facilitate obtaining updates for the clients, the computer-executable instructions including instructions that are executable to cause the computer system to perform at least the following:

identify a dataset associated with the plurality of clients, the dataset comprising a plurality of byte ranges identify, for each given client of the plurality of clients one or more byte ranges of the plurality of byte ranges of the dataset that each given client has already obtained;

identify, for each given client of the plurality of clients, one or more byte ranges of the plurality of byte ranges of the data set that each given client needs to obtain; and based on the identification of byte ranges, organize the plurality of clients into a plurality of groups, each group both including one or more clients and corresponding to a different node of a hierarchical graph, each given node being associated with one or more byte ranges of the plurality of byte ranges of the dataset, such that each client of a group corresponding to the given node has already obtained or needs to obtain at least one byte range of the one or more byte ranges associated with the given node, at least one client of each group being configured to act as a peer to other clients of the group, the hierarchical graph comprising a plurality of nodes that range from one or more nodes having a smallest number of byte ranges to one or more nodes having a largest number of byte ranges, such that the hierarchical graph can be traversed from the one or more nodes having the smallest number of byte ranges to the one or more nodes having the largest number of byte ranges.

17. The computer program product of claim 16, further comprising a prediction module configured to identify additional portions of an overall dataset that at least one client of the plurality of clients may need.

18. The computer program product of claim 16, wherein each of the one or more clients, of a given group corresponding to a given node that is associated with one or more byte ranges, have already obtained or need to obtain exactly the one or more byte ranges associated with the given node and no additional byte ranges of the dataset.

19. The system of claim 7, wherein the mask is encoded using bits such that each range of bytes is encoded as a bit.

20. The system of claim 19, wherein encoding the mask using bits comprises indicating, for each given node, whether the node is associated with a given range of bytes of the dataset using bits.

* * * * *